(12) United States Patent
Wang et al.

(10) Patent No.: US 7,920,619 B2
(45) Date of Patent: Apr. 5, 2011

(54) EFFICIENT COMPUTATION OF A WAVEFORM CORRELATION MATRIX

(75) Inventors: Yi-Pin Eric Wang, Cary, NC (US); Gregory E. Bottomley, Cary, NC (US); Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 920 days.

(21) Appl. No.: 11/739,924

(22) Filed: Apr. 25, 2007

(65) Prior Publication Data

US 2008/0267261 A1 Oct. 30, 2008

(51) Int. Cl.
 *H04B 1/00* (2006.01)
(52) U.S. Cl. ......................................... 375/148; 375/147
(58) Field of Classification Search ................... 375/148
See application file for complete search history.

(56) References Cited

U.S. PATENT DOCUMENTS

| | | | |
|---|---|---|---|
| 6,320,897 B1 * | 11/2001 | Fattouche et al. | 375/130 |
| 6,975,666 B2 * | 12/2005 | Affes et al. | 375/130 |
| 7,218,984 B1 * | 5/2007 | Bayat et al. | 700/121 |
| 7,583,766 B2 * | 9/2009 | Hongming et al. | 375/346 |
| 2001/0024454 A1 * | 9/2001 | Hasegawa et al. | 370/503 |
| 2002/0051433 A1 * | 5/2002 | Affes et al. | 370/335 |
| 2004/0073124 A1 * | 4/2004 | Axel | 600/509 |
| 2005/0111528 A1 | 5/2005 | Fulghum et al. | |
| 2006/0280255 A1 * | 12/2006 | Hongming et al. | 375/260 |
| 2006/0280273 A1 * | 12/2006 | Mueller-Weinfurtner | 375/368 |
| 2008/0101622 A1 * | 5/2008 | Sugiyama | 381/66 |
| 2008/0267265 A1 * | 10/2008 | Cairns et al. | 375/150 |
| 2009/0304049 A1 * | 12/2009 | Fathi et al. | 375/148 |

OTHER PUBLICATIONS

Verdu, S. Multiuser Detection, Cambridge, UK: Cambridge University Press, 1998.
Co-pending U.S. Appl. No. 11/566,756, filed Dec. 5, 2006.
Co-pending U.S. Appl. No. 11/739,126, filed Apr. 24, 2007.

* cited by examiner

*Primary Examiner* — David C Payne
*Assistant Examiner* — Erin M File
(74) *Attorney, Agent, or Firm* — Coats & Bennett, P.L.L.C.

(57) ABSTRACT

A method and apparatus for reducing the complexity of waveform correlation computations used by a multicode receiver is described herein. One exemplary multicode receiver includes a despreading unit, channel estimator, and waveform correlation calculator. The despreading unit despreads a received multicode signal to generate despread symbols. The channel estimator estimates channel coefficients associated with the despread symbols. The waveform correlation calculator determines waveform correlations between the transmitted symbols in successive processing windows that span two or more symbol periods and that overlap in time. To reduce the computational complexity associated with computing waveform correlations, the calculator may reuse channel coefficients and/or net channel correlations for multiple symbol periods and/or processing windows. The calculator may also reduce complexity by reusing one or more waveform correlations from a previous processing window as waveform correlations for one or more subsequent processing windows and/or by exploiting the Hermitian symmetry of the waveform correlation matrix.

17 Claims, 5 Drawing Sheets

EFFICIENT COMPUTATION OF A WAVEFORM CORRELATION MATRIX

BACKGROUND

Interference due to channel dispersion presents one challenge to obtaining high data transmission rates in Code Division Multiple Access (CDMA) systems, such as Wideband CDMA and IS-2000. Performance in CDMA systems is sensitive to multi-path dispersion when a low spreading factor and/or multicode is used to transmit data. With dispersion, multiple echoes of the transmitted signal arrive at the receiver with different relative delays. These echoes interfere with one another. The interference results in a loss of orthogonality between successive symbols and between symbols sent on different, orthogonal codes.

Generalized RAKE (GRAKE) receivers provide one means for suppressing interference. Interference suppression is achieved by treating Intersymbol Interference (ISI) and Multiple Access Interference (MAI) as colored Gaussian noise. The noise correlation across fingers is exploited by adapting the finger delays and combining weights. In this way, the orthogonality between user signals may be partially restored. Recently, further improvements in GRAKE receivers have been proposed for the High Speed Downlink Packet Access (HSDPA) mode of WCDMA that take into account waveform correlations.

Multicode detection techniques that rely on waveform correlations provide another technique for suppressing MAI and ISI. Exemplary multicode detectors include a Maximum Likelihood Sequence Estimation (MLSE) detector, a minimum mean squared error (MMSE) detector, and a decorrelating detector. Because the computational complexity of conventional multicode detectors grows exponentially with the number of codes, there remains an interest in reducing the computational complexity associated with multicode detection.

SUMMARY

The present invention comprises an apparatus for reducing the complexity of waveform correlation computations used by a multicode receiver to process received multicode signals containing a plurality of symbols transmitted over two or more codes. In one exemplary embodiment, the multicode receiver includes a despreading unit, a channel estimator, and a waveform correlation calculator. The despreading unit despreads the received multicode signal to generate despread symbols. The channel estimator estimates channel coefficients associated with the despread symbols in successive symbol periods. The waveform correlation calculator determines waveform correlations between transmitted symbols corresponding to the despread symbols in successive processing windows that span two or more symbol periods and that overlap in time.

In one embodiment, the waveform correlation calculator reduces the computational complexity associated with computing the waveform correlations by reusing channel coefficients used to determine waveform correlations in one processing window to determine the waveform correlations in one or more subsequent processing windows. In another embodiment, the waveform correlation calculator reduces the computational complexity by computing net channel correlations based on the channel coefficients, and reusing the computed net channel correlations over multiple processing windows and/or symbol periods to determine the corresponding waveform correlations. In another embodiment, the waveform correlation calculator reduces the computational complexity by reusing one or more waveform correlations computed for a previous processing window as waveform correlations for one or more subsequent processing windows. Computational complexity may be further reduced by exploiting the Hermitian symmetry of the waveform correlation matrix.

DETAILED DESCRIPTION

Figure 1:
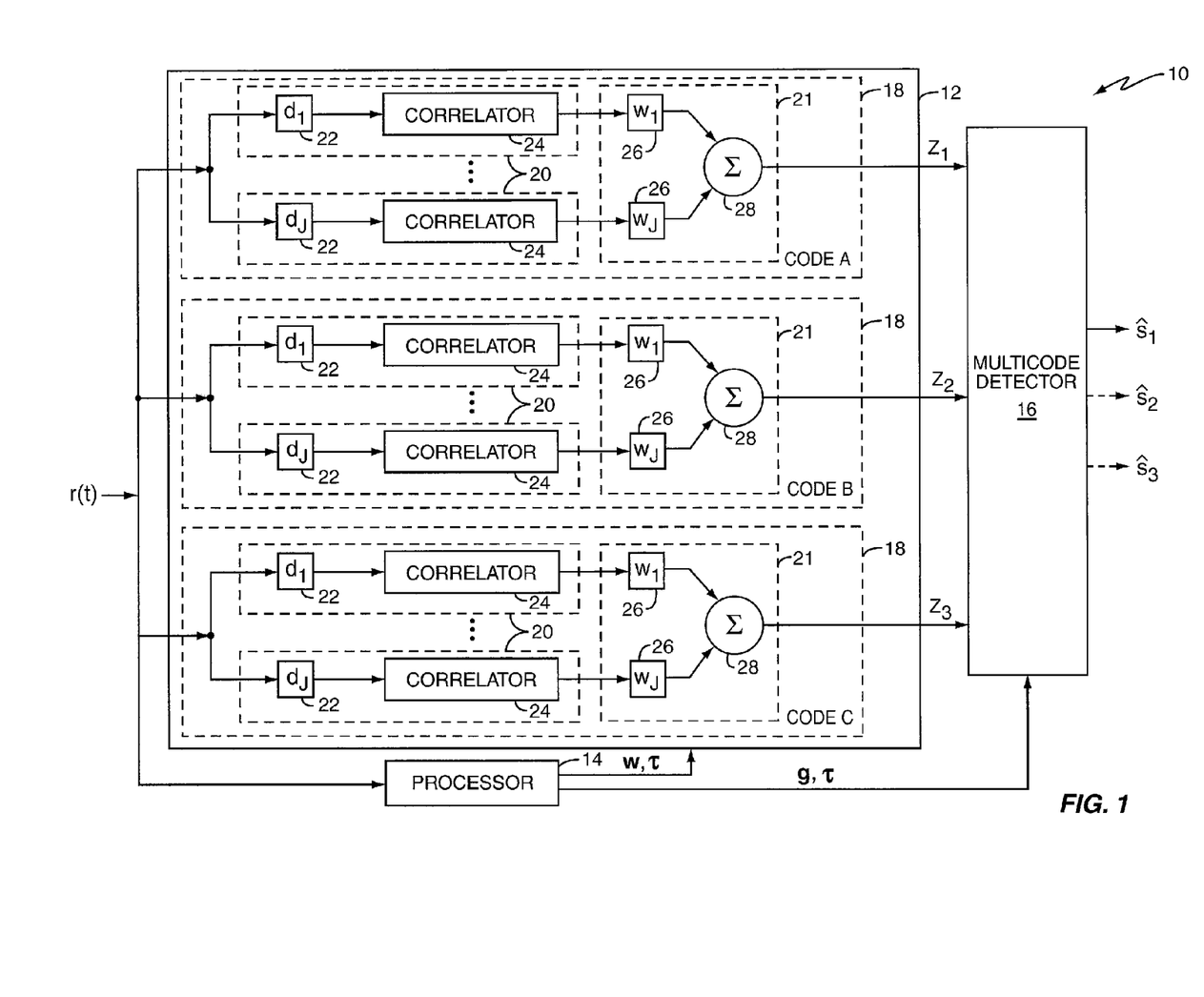
FIG. 1 shows an exemplary receiver in a mobile communication system.

The present invention provides multiple techniques for reducing the computational complexity associated with waveform correlations used in multicode detection. FIG. 1 illustrates a block diagram of one exemplary multicode receiver 10 that jointly detects signals transmitted on different spreading codes and received as a composite received signal r(t). The receiver 10 may be deployed in any wireless network element, e.g., a base station, mobile terminal, etc. Receiver 10 comprises a RAKE section 12, a processor 14, and a multicode detector 16. RAKE section 12 despreads the composite received signal r(t) and generates a vector of RAKE combined values corresponding to each spreading code based on combining weights and path delays provided by processor 14. Multicode detector 16 jointly processes the RAKE combined values to generate estimates of the transmitted symbols based on channel coefficients and path delays provided by processor 14.

RAKE section 12 comprises a plurality of RAKE and/or GRAKE receivers 18. Each RAKE receiver 18 includes a plurality of RAKE fingers 20 and a RAKE combiner 21. Each RAKE finger 20 comprises a delay element 22 and a despreader or correlator 24 for processing different time shifts or multi-path echoes of the received signal r(t). Delay elements 22 delay the received signal r(t) responsive to a path delay $\tau$ selected by processor 14 to time align the multi-path echoes processed by each RAKE finger 20. Correlators 24 correlate the delayed signals with a spreading code to extract the assigned multi-path echoes from the received signal r(t).

RAKE combiner 21 combines the despread values from correlators 24 to generate a RAKE combined value, also referred to as a despread symbol, for each code-multiplexed symbol during each symbol period. Combiner 21 includes weighting elements 26 and summer 28. Weighting elements 26 weight the despread values output from respective correlators 24 responsive to weighting factors computed by processor 14. Summer 28 combines the weighted despread values symbol-by-symbol to form the RAKE combined values. Those skilled in the art will appreciate that the combining weights associated with weighting elements 26 may comprise RAKE combining weights that correspond to the channel coefficients, or GRAKE combining weights that correspond to the channel coefficients and a noise correlation matrix.

Each RAKE combined value represents a symbol of interest or an interfering symbol. It should be noted that the symbols of interest also interfere with each another. Therefore, when considering a given symbol of interest the other symbols of interest represent interfering symbols.

The vector of RAKE combined values, denoted z, output by RAKE section 12 may be expressed as:

$$z = RAs + n, \quad (1)$$

where $s = (s_0, \ldots, s_{K-1})^T$ represents a vector of symbols to be considered for joint detection, $A = \text{diag}(A_0, \ldots, A_{K-1})$ represents a diagonal matrix with the $k^{th}$ element corresponding to the received amplitude for $s_k$, R represents a waveform correlation matrix, and n represents a vector of the noise. The vector z includes both symbols of interest and interfering symbols. The elements of R represent the correlations of the effective spreading waveforms of the symbols in s with each other and with themselves. The elements of R may be given by:

$$R(u,v) = \int_{-\infty}^{\infty} f_u^H(t) f_v(t) dt, \quad (2)$$

where $f_u(t) = [f_{u,0}(t), f_{u,1}(t), \ldots, f_{u,Q-1}(t)]^T$ represents the effective waveform for symbol $s_u$, with each element of the effective waveform corresponding to the $q^{th}$ receive antenna. The number of receive antennas equals Q. The effective spreading waveform considered is a combination of the transmit waveform and the radio channel impulse response. It can be demonstrated that $\sigma^2 R$ represents the covariance of the noise vector n, where $\sigma^2$ represents the noise variance at the input to RAKE section 12.

Multiple access interference (MAI) and intersymbol interference (ISI) due to channel dispersion corrupts the RAKE combined values output by the RAKE section 12. In the case of MAI, the symbols transmitted on different codes interfere with one another. In the case of ISI, channel dispersion causes symbols transmitted on the same code to interfere with one another. It should be noted that multi-path propagation may cause a transmitted symbol to interfere with itself. Multicode detector 16 employs multicode detection techniques to suppress MAI and ISI due to channel dispersion and to generate estimates of the transmitted symbols. The term multicode detector is used rather than multi-user detector because the transmitted symbols may belong to the same user or to different users.

Multicode detector 16 computes the symbol estimates according to:

$$\hat{s} = Mz. \quad (3)$$

In one embodiment, multicode detector 16 comprises a decorrelating detector, which computes the symbol estimates by setting $M = R^{-1}$ so that:

$$\hat{s} = R^{-1} z. \quad (4)$$

In another embodiment, detector 16 comprises a Linear Minimum Mean Square Error (LMMSE) detector, which computes the symbol estimates by computing M according to:

$$M = A^{-1} [R + \sigma^2 A^{-2}]^{-1} \quad (5)$$

where $\sigma^2$ is the noise variance at the input of the RAKE section 12. It will be appreciated that other multicode detectors may be used, such as a nonlinear Maximum Likelihood Sequence Estimator (MLSE) or other linear multicode detectors, or the multicode detectors discussed in U.S. application Ser. No. 11/739,126 entitled "Robust Multicode Detector for HSDPA" and filed 24 Apr. 2007, which is herein incorporated by reference. For the MLSE detector, s-parameters, which are similar to waveform correlations, need to be computed.

Figure 2:
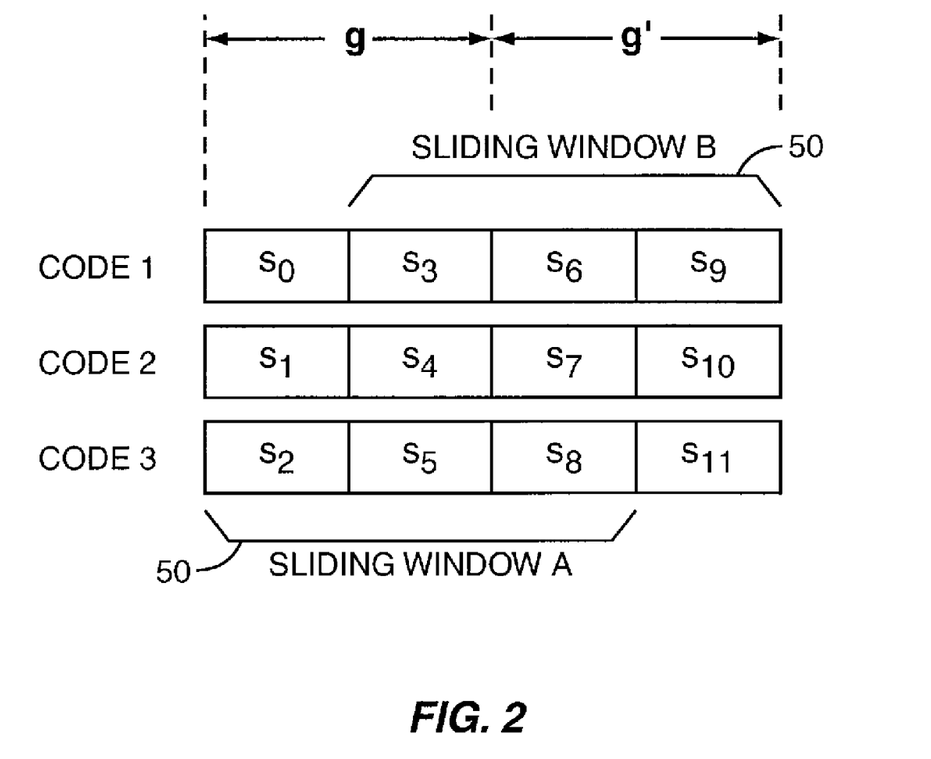
FIG. 2 shows multiple symbols received over multiple codes during multiple symbol periods relative to a sliding processing window.

Multicode detector 16 employs a sliding window approach in which combined values received over multiple codes during multiple symbol periods are processed to produce symbol estimates for a current symbol period. FIG. 2 illustrates a sliding processing window 50 applied to symbols received over three codes during four symbol periods. During each symbol period, the symbols in the processing window 50 are selected and stacked to form the RAKE combined values z used to compute $\hat{s}$. In this example, the processing window 50 spans three symbol periods for three codes, is centered on a current symbol period, and extends forward and backward in time one symbol period. During each symbol period, the multicode detector 16 estimates the symbols at the center of the processing window 50 based on the waveform correlation matrix R computed for the symbols in processing window 50. It will be appreciated that any size processing window may be used.

Due to the large number of codes and RAKE fingers 20, calculating the waveform correlations for R is computationally complex. The present invention reduces the complexity associated with the waveform correlation calculations. One exemplary embodiment reuses channel coefficients for multiple symbol periods to reduce the computational complexity associated with waveform correlations. Elements of the waveform correlation matrix R may be computed according to:

$$R(u,v) = \quad (6)$$
$$\sum_{q=0}^{Q-1} \sum_{l_1=0}^{L^{(i(u))}} \sum_{l_2=0}^{L^{(i(v))}} \sum_{m_0=0}^{N_{k(u)}^{(i(u))}-1} \sum_{m_1=0}^{N_{k(v)}^{(i(v))}-1} (g_q^{(i(u))}(l_1)^* g_q^{(i(v))}(l_2) (c_{k(u),j(u)}^{(i(u))}(m_0))^*$$
$$c_{k(v),j(v)}^{(i(v))}(m_1) \times R_p((j(u) N_{k(u)}^{(i(u))} - j(v) N_{k(v)}^{(i(v))} + m_0 - m_1) T_c +$$
$$\tau^{(i(u))}(l_1) - \tau^{(i(v))}(l_2) + o^{(i(u))} - o^{(i(v))}),$$

where the terms in Equation (6) have the following definitions. The index q indicates the receive antenna and ranges from 0 to Q−1. Indices $m_0$ and $m_1$ represent chip indices. Indices $l_1$ and $l_2$ represent path delays and $L^i$ represents the number of paths for each transmitter. The term $g_q^{(i)}(l)$ represents the complex channel coefficient for the $l^{th}$ path for transmitter i and antenna q, and $\tau^{(i)}(l)$ represents the path delay for the $l^{th}$ path. The term $o^{(i)}$ represents the transmit time offset for transmitter i, and $N_k^{(i)}$ represents the spreading factor for code k and transmitter i. $T_c$ represents the chip period and $c_{k,j}^{(i)}$ is the spreading sequence (scrambled Walsh code) for code k and transmitter i during the $j^{th}$ symbol period. $R_p(\lambda)$ represents the value of the chip pulse autocorrelation function for argument $\lambda$. The transmitter index $i(u) = \lfloor \text{mod}(u, KM)/K \rfloor$. The code index $k(u) = \text{mod}(u/K)$. The symbol period index $j(u) = \lfloor u/(KM) \rfloor$. M represents the number of transmitters.

As shown in Equation (6), the waveform correlations R(u, v) depend on the channel coefficients g. Because channel coefficients may change slowly, the computational complexity associated with the waveform correlations may be reduced by reusing channel coefficients for multiple symbol periods. To illustrate, consider the example shown in FIG. 2, where symbols $s_0, s_1, \ldots s_5$ share channel coefficients g, while symbols $s_6, s_7, \ldots s_{11}$, share channel coefficients g'. For processing window A, R(u,v) where $(u,v) \in \{0, 1, \ldots, 5\}$ is calculated based on g. However, R(u,v) where $(u,v) \in \{6,7,8\}$ is calculated based on g', and R(u,v) where $u \in \{0, 1, \ldots, 5\}$ and $v \in \{6,7,8\}$ is calculated based on g and g'. As a result, computing the waveform correlations for processing window A using Equation (6) generally requires computing different channel coefficient products based on g and g'(g*g, g*g', (g')*g'). By assuming that g≈g', g may be reused for symbols $s_6, s_7, s_8$. This enables g to be used to compute all of the waveform correlations for processing window A. Thus, it will be appreciated that reusing channel coefficients over multiple symbol periods reduces the complexity of computing waveform correlations for each processing window 50. Further, it will be appreciated that reusing the channel coefficients for multiple processing windows 50 also reduces the computational complexity associated with waveform correlations.

Alternatively or in addition, the computational complexity of the waveform correlation computations may be reduced by computing net channel correlations based on the channel coefficients, and reusing the computed net channel correlations to compute the waveform correlations for multiple symbol periods and/or multiple processing windows 50. Here, the "net" channel represents the transmit chip pulse shape convolved with the medium response. Equation (6) may be rewritten as:

$$R(u, v) = \qquad (7)$$

$$\sum_{m_0=0}^{N_{k(u)}^{(i(u))}-1} \sum_{m_1=0}^{N_{k(v)}^{(i(v))}-1} (c_{k(u),j(u)}^{(i(u))}(m_0))^* c_{k(v),j(v)}^{(i(v))}(m_1) \sum_{q=0}^{Q-1} \sum_{l_1=0}^{L^{(i(u))}} \sum_{l_2=0}^{L^{(i(v))}} (g_q^{(i(u))}(l_1))^*$$

$$g_q^{(i(v))}(l_2) \times R_p((j(u)N_{k(u)}^{(i(u))} - j(v)N_{k(v)}^{(i(v))} + m_0 - m_1)T_c +$$

$$\tau^{(i(u))}(l_1) - \tau^{(i(v))}(l_2) + o^{(i(u))} - o^{(i(v))}) =$$

$$\sum_{m_0=0}^{N_{k(u)}^{(i(u))}-1} \sum_{m_1=0}^{N_{k(v)}^{(i(v))}-1} (c_{k(u),j(u)}^{(i(u))}(m_0))^* c_{k(v),j(v)}^{(i(v))}(m_1)$$

$$\xi((j(u)N_{k(u)}^{(i(u))} - j(n_1)N_{k(v)}^{(i(v))} + m_0 - m_1)T_c, i(u), i(v)).$$

Equation (7) shows that a waveform correlation R(u,v) is computed based the product of a spreading sequence correlation $(c(m_0)^* c(m_1))$ and a net channel correlation $(\zeta(t,i_1,i_2))$, wherein the net channel correlations $\zeta(t,i_1,i_2)$ may be calculated according to:

$$\xi(t, i_1, i_2) = \qquad (8)$$

$$\sum_{q=0}^{Q-1} \sum_{l_1=0}^{L^{(i_1)}} \sum_{l_2=0}^{L^{(i_2)}} (g_q^{(i_1)}(l_1))^* g_q^{(i_2)}(l_2) R_p(t + \tau^{(i_1)}(l_1) - \tau^{(i_2)}(l_2) + o^{(i_1)} - o^{(i_2)}).$$

When $i_1 = i_2$, $\zeta(t,i_1,i_2)$ represents the net channel autocorrelation; when $i_1 \neq i_2$, $\zeta(t,i_1,i_2)$ represents the net channel crosscorrelation.

As shown by Equation (8), the net channel correlations $\zeta(t,i_1,i_2)$ depend on the channel coefficients g and the chip pulse autocorrelation function $R_p$, and do not depend on symbol-dependent spreading codes c. When the channel coefficients for multiple symbol periods and/or multiple codes are assumed to be constant, the net channel correlations $\zeta(t,i_1,i_2)$ will also be constant. Thus, in one embodiment, the net channel correlations $\zeta(t,i_1,i_2)$ used to compute R for the symbols in one processing window 50 may be reused to compute R for the symbols in one or more subsequent processing windows 50. Alternatively or in addition, the net channel correlations $\zeta(t,i_1,i_2)$ used to compute elements of R for one pair of symbols in a symbol period may be reused to compute elements of R for another pair of symbols in the same symbol period. Further, the net channel correlations $\zeta(t,i_1,i_2)$ used to compute elements of R for one symbol period of a processing window 50 may be reused to compute elements of R for one or more subsequent symbol periods of the sliding processing window 50. When the net channel correlations $\zeta(t,i_1,i_2)$ are reused for one or more symbol periods and/or one or more processing windows 50, the process for computing the elements of R only requires the repeated calculation of the spreading sequence correlations $(c(m_0)^* c(m_1))$ and their convolution with the reused net channel correlations according to Equation (7). Thus, reusing the net channel correlations $\zeta(t,i_1,i_2)$ over multiple symbol periods and/or multiple processing windows 50 reduces the computational complexity associated with the waveform correlation computations.

Eventually, the channel coefficient estimates need to change to track the time-varying channel. Referring to FIG. 2, consider the case where g' is much different than g. For this case, assuming the channel does not vary too quickly, the channel coefficients may be assumed to be constant within a processing window 50. Thus, g is used when computing waveform correlations for $s_3$ and $s_6$ in sliding window A, and g' is used when computing waveform correlations for $s_3$ and $s_6$ in sliding window B. As a result, the waveform correlations may periodically be computed twice to handle transitions in the channel estimates.

Figure 3:
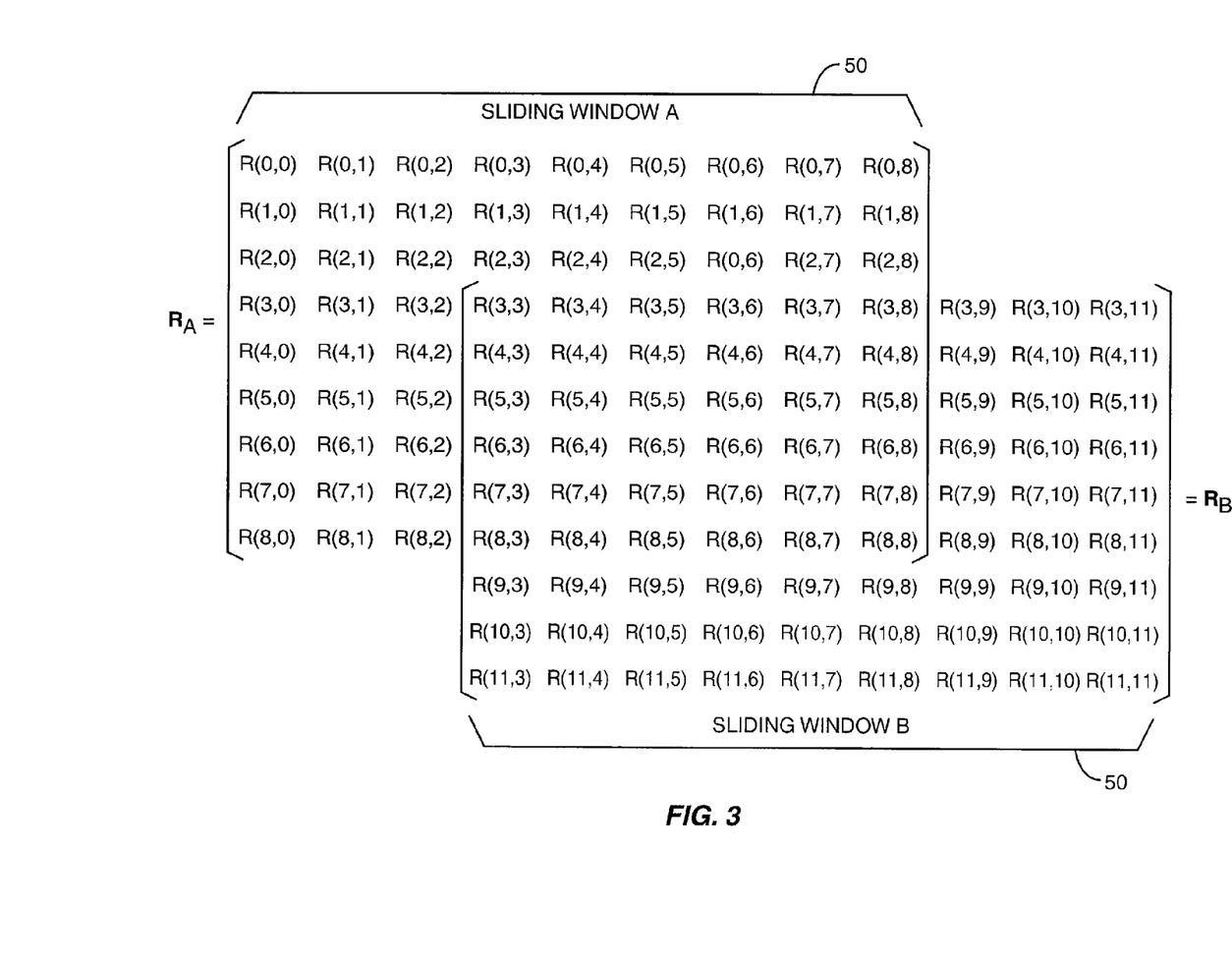
FIG. 3 shows multiple waveform correlation matrices computed for multiple symbol periods relative to a sliding processing window.

In another embodiment, one or more previously computed waveform correlations may be reused for multiple processing windows 50 to reduce the computational complexity associated with waveform correlations. To illustrate, consider FIG. 3, which shows the waveform correlation matrices $R_A$ and $R_B$ for the processing windows A and B, respectively. The waveform correlation matrices $R_A$ and $R_B$ include the same values when $(u,v) \in \{3, 4, \ldots, 8\}$. FIG. 3 illustrates this by showing the waveform correlations computed for processing window A that may be reused for processing window B. Further, if processing window B is advanced one symbol period, the waveform correlations for $(u,v) \in \{6, 7, \ldots, 11\}$ computed for processing windows A and B are the same for the new processing window 50. Thus, as processing window 50 advances, a sliding effect may be applied to the waveform correlation matrix R that enables multiple waveform correlations to be reused for one or more subsequent processing windows 50. For a processing window 50 covering three codes and three symbol periods, such reuse decreases the computational complexity by more than 40%. Thus, reusing previously computed waveform correlations provides significant computational complexity savings.

In another embodiment, the computational complexity may be reduced by recognizing that $R(u,v) = R^*(v,u)$, and therefore, that R is Hermitian symmetrical. Thus, the computational complexity may be reduced by computing the waveform correlations for the upper or lower triangle of R, and using the Hermitian symmetry relationship to provide the remaining waveform correlations.

It will be appreciated that while the above describes four complexity reduction techniques, the present invention may combine one or more of the above-described complexity reduction techniques to reduce the complexity associated with computing waveform correlations.

Figure 4:
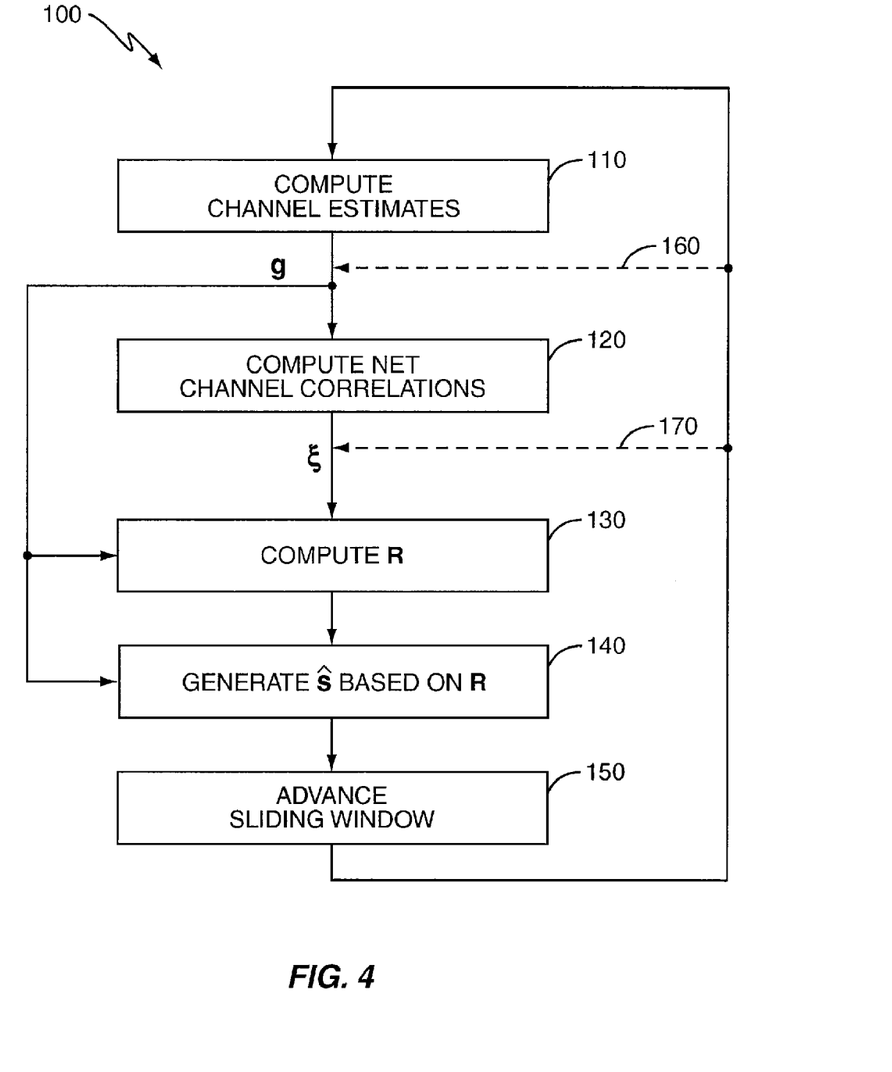
FIG. 4 shows one exemplary process for computing waveform correlations.

FIG. 4 shows one exemplary process 100 for computing the waveform correlation matrix R. Processor 14 provides computed channel estimates g to the multicode detector 16 (block 110). Multicode detector 16 computes elements of the waveform correlation matrix R (block 130) based on net channel correlations $\zeta$ computed based on the channel coefficients g (block 120) or based directly on the channel coefficients g. It will be appreciated that the channel estimates g and/or the net channel correlations ζ may be reused for multiple symbol periods within the processing window 50. After generating the estimates of the transmitted symbols based on R (block 140), the multicode detector 16 advances the sliding processing window 50 one symbol period (block 150). For the new processing window of RAKE combined values, the multicode detector 16 reuses the previously computed net channel correlations ζ (path 170) or computes a new net channel correlation based on g (path 160) to determine the elements of R for the new processing window. It will be appreciated that the multicode detector 16 may reuse one or more previously computed waveform correlations R(u,v) and/or exploit the Hermitian symmetry of R to reduce the number of waveform correlations R(u,v) computed for the waveform correlation matrix R in block 130, and therefore, to reduce the computational complexity associated with R.

Figure 5:
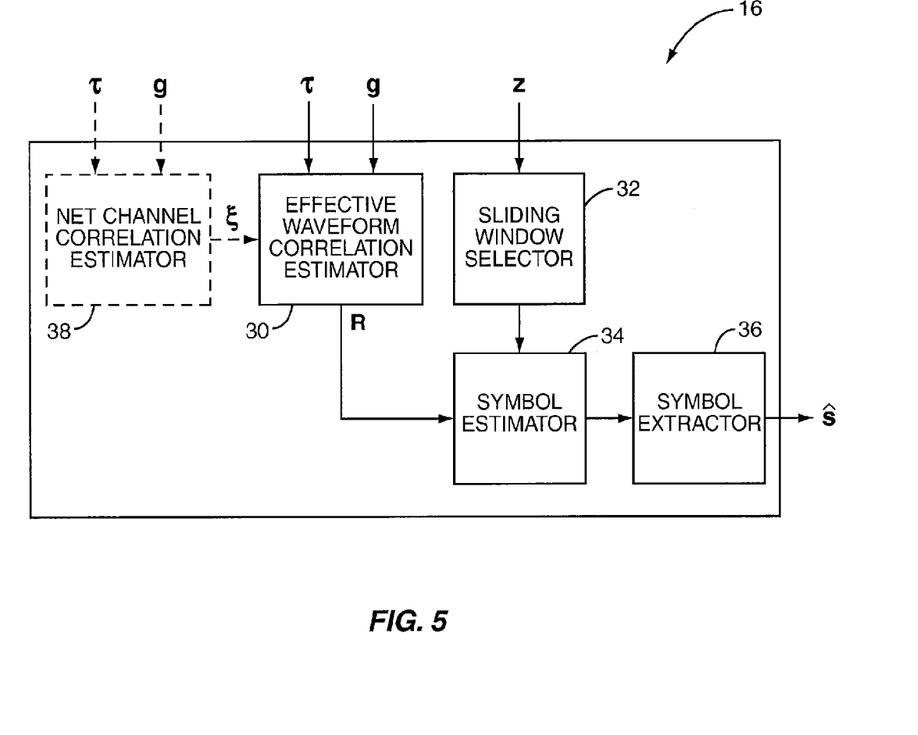
FIG. 5 shows an exemplary multicode detector for jointly detecting symbols transmitted over multiple code channels.

FIG. 5 illustrates an exemplary multicode detector 16 that computes and utilizes the waveform correlations to generate symbol estimates for demodulation, as described above. Multicode detector 16 comprises a waveform correlation estimator 30, sliding window selector 32, symbol estimator 34, and symbol extractor 36. In one embodiment, the waveform correlation estimator 30 estimates the effective spreading waveform correlations for the symbols in the sliding processing window 50 and generates the waveform correlation matrix R based on the channel coefficients g and path delays τ provided by processor 14, as discussed above. In another embodiment detector 16 includes a net channel correlation estimator 38 that estimates the net channel correlations based on the channel coefficients g and path delays τ provided by processor 14. For this embodiment, the waveform correlation estimator 30 generates the waveform correlation matrix R based on the net channel correlations provided by the net channel correlation estimator 38, as discussed above. Symbol estimator 34 estimates the symbols, for example according to Equations (3)-(5), in the processing window 50 based on the waveform correlation matrix R provided by estimator 30. Symbol extractor 36 extracts symbols corresponding to a current or middle symbol period(s) and outputs the extracted symbol estimates for demodulation. For example, when a processing window 50 spans five symbol periods, the symbol extractor 36 may extract symbol estimates for the middle three symbol periods.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for processing a received multicode signal containing a plurality of symbol streams transmitted over two or more codes, said method comprising:
   despreading the received multicode signal over a plurality of successive symbol periods to generate despread symbols;
   determining waveform correlations between transmitted symbols corresponding to said despread symbols in successive processing windows that span two or more symbol periods and that overlap in time; and
   reducing computational load for computing said waveform correlations by reusing channel coefficients used to determine the waveform correlations in a previous processing window to determine the waveform correlations in one or more subsequent processing windows;
   wherein reducing the computational load for computing the waveform correlations further comprises:
      computing the waveform correlations in one of a lower triangle and an upper triangle of a waveform correlation matrix to determine a partial waveform correlation matrix; and
      taking the conjugate of waveform correlations in the partial waveform correlation matrix to determine the remaining waveform correlations for the waveform correlation matrix.

2. The method of claim 1 wherein reusing the channel coefficients comprises reusing the channel coefficients used to determine the waveform correlations in one symbol period of a current processing window to determine the waveform correlations in one or more subsequent symbol periods of the current processing window.

3. The method of claim 1 wherein reusing the channel coefficients comprises computing net channel correlations based on the channel coefficients and reusing the net channel correlations used to determine the waveform correlations in a previous processing window to determine the waveform correlations in one or more subsequent processing windows.

4. The method of claim 3 wherein reusing the net channel correlations further comprises reusing the net channel correlations used to determine the waveform correlations in one symbol period of a current processing window to determine the waveform correlations in one or more subsequent symbol periods of the current processing window.

5. The method of claim 4 wherein reusing the net channel correlations comprises determining waveform correlations between a second pair of symbols in one symbol period by reusing the net channel correlations used to determine the waveform correlations between a first pair of symbols in the same symbol period.

6. The method of claim 1 wherein reducing the computational load for computing said waveform correlations further comprises reusing one or more of the waveform correlations computed for the previous processing window as one or more of the waveform correlations for one or more subsequent processing windows.

7. The method of claim 1 further comprising estimating a symbol of interest based on the waveform correlations.

8. The method of claim 1 wherein the waveform correlations are periodically re-computed using different channel coefficients.

9. A multicode receiver for processing a received multicode signal containing a plurality of symbol streams transmitted over two or more codes, said multicode receiver comprising:
   a despreading unit for despreading the received multicode signal over a plurality of successive symbol periods to generate despread symbols;
   a channel estimator configured to estimate channel coefficients associated with despread symbols in successive symbol periods;
   a waveform correlation calculator for determining waveform correlations between transmitted symbols corresponding to said despread symbols in successive processing windows that span two or more symbol periods and that overlap in time; and
   wherein said waveform correlation calculator reduces computational load for computing said waveform correlations by reusing the channel coefficients used to determine the waveform correlations in a previous processing window to determine the waveform correlations in one or more subsequent processing windows; and wherein said waveform correlation calculator further reduces the computational load for computing said waveform correlations by:

computing the waveform correlations in one of a lower triangle and an upper triangle of a waveform correlation matrix to determine a partial waveform correlation matrix; and taking the conjugate of waveform correlations in the partial waveform correlation matrix to determine the remaining waveform correlations for the waveform correlation matrix.

10. The multicode receiver of claim 9 wherein said waveform correlation calculator further reduces the computational load for computing said waveform correlations by reusing the channel coefficients used to determine the waveform correlations in one symbol period of a current processing window to determine the waveform correlations in one or more subsequent symbol periods of the current processing window.

11. The multicode receiver of claim 9 further comprising a net channel correlation calculator for determining net channel correlations based on the channel coefficients associated with despread symbols in successive symbol periods.

12. The multicode receiver of claim 11 wherein said waveform correlation calculator further reduces the computational load for computing said waveform correlations by reusing the net channel correlations used to determine the waveform correlations in a previous processing window to determine the waveform correlations in one or more subsequent processing windows.

13. The multicode receiver of claim 12 wherein said waveform correlation calculator determines the waveform correlations between a second pair of symbols in one symbol period by reusing the net channel correlations used to determine the waveform correlations between a first pair of symbols in the same symbol period.

14. The multicode receiver of claim 11 wherein said waveform correlation calculator further reduces the computational load by reusing the net channel correlations used to determine the waveform correlations in one symbol period of a current processing window to determine the waveform correlations in one or more subsequent symbol periods of the current processing window.

15. The multicode receiver of claim 9 wherein said waveform correlation calculator further reduces the computational load by reusing one or more of the waveform correlations computed for the previous processing window as one or more of the waveform correlations for one or more of the subsequent processing windows.

16. The multicode receiver of claim 9 further comprising a symbol estimator for estimating a symbol of interest based on the waveform correlations.

17. The multicode receiver of claim 9 wherein said waveform correlation calculator periodically re-computes the waveform correlations using different channel coefficients.

* * * * *

UNITED STATES PATENT AND TRADEMARK OFFICE
CERTIFICATE OF CORRECTION

PATENT NO. : 7,920,619 B2
APPLICATION NO. : 11/739924
DATED : April 5, 2011
INVENTOR(S) : Wang et al.

Page 1 of 1

It is certified that error appears in the above-identified patent and that said Letters Patent is hereby corrected as shown below:

In Fig. 3, Sheet 3 of 5, below "SLIDING WINDOW A", in Column 7, Line 3, delete "R(0,6)" and insert -- R(2,6) --, therefor.

In Column 3, Line 58, in Equation 5, after " $M=A^{-1}[R+\sigma^2 A^{-2}]^{-1}$ " insert -- , --.

In Column 4, Line 54, delete " $\overline{Yu}$ " and insert -- $\underline{u}$ --, therefor.

Signed and Sealed this
Sixth Day of September, 2011

David J. Kappos
*Director of the United States Patent and Trademark Office*